United States Patent
Chu (10) Patent No.: US 6,393,473 B1
(45) Date of Patent: May 21, 2002

(54) REPRESENTING AND VERIFYING NETWORK MANAGEMENT POLICIES USING COLLECTIVE CONSTRAINTS

(75) Inventor: Clare Chu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/215,393

(22) Filed: Dec. 18, 1998

(51) Int. Cl.[7] .............................................. G06F 15/177
(52) U.S. Cl. ...................................................... 709/223
(58) Field of Search ................................ 709/223, 222, 709/224

(56) References Cited

U.S. PATENT DOCUMENTS

| | | | | |
|---|---|---|---|---|
| 5,764,957 A | * | 6/1998 | Kihl et al. ................... | 709/235 |
| 5,872,928 A | * | 2/1999 | Lewis et al. ................. | 709/222 |
| 6,079,034 A | * | 6/2000 | VanZante et al. ............. | 714/48 |
| 6,085,238 A | * | 7/2000 | Yuasa et al. ................. | 709/223 |

OTHER PUBLICATIONS

Kumar, Vipin, et al., "Algorithms for Constant Satisfaction Problems: A survey", AI Magazine, 13(1):32–44, 1992.

M. Sabin et al., "Constraint–Based Modeling: From Diagnosis and Configuration to Network Management," Proceedings of the CP96 Workshop on Applications of Constraint Programming, Cambridge, Ma, Aug. 1996.

M. Wallace "Constraint Programming," Wm. Penney Lab., Imperial College, London, Sep. 1995, from "www.icparc, ac,uk/eclipse/reports/handbook/handbook.html."

E. Bruchez et al., "Java Constraint Library, " from "liawww.epfl.ch/–torrens/Project/project/node27.html," Nov. 11, 1997.

M. Torrens, "Java Constraint Library," from liawww.epfl.ch/ –torrens/Project/JCL/, Apr. 2000.

R. Bartak, "On–Line Guide to Constraint Programming," 1998.

* cited by examiner

Primary Examiner—David Y. Eng
(74) Attorney, Agent, or Firm—Hickman Palermo Truong & Becker LLP (57) ABSTRACT

A method and apparatus are provided for representing abstract network management policies and processing such policies to resolve conflicts. In one aspect, the invention provides a method of managing a network according to a plurality of network management policies, comprising the steps of storing each of the policies as a constraint that comprises one or more variables, a set of possible values, and a set of restrictions on the values that the variables can simultaneously take; storing one or more collective constraints, in which at least one of the constraints is that none of the variables may interfere with one another; applying a constraint satisfaction algorithm to the stored variables, values, restrictions, to create zero or more solutions and checking the solution set against the collective constraints; identifying a conflict in the policies when zero solutions are created and when one or more of the instance or collective constraints is violated; and resolving the conflict by modifying one or more of the variables, values or restrictions. Using a collective constraint representation, policy conflicts are rapidly identified and resolved. Resolution may be accomplished simply by adding a constraint that defines a change in a variable, value, or restriction or redefining the collective constraints.

29 Claims, 4 Drawing Sheets

REPRESENTING AND VERIFYING NETWORK MANAGEMENT POLICIES USING COLLECTIVE CONSTRAINTS

FIELD OF THE INVENTION

The present invention relates to data processing in the field of network management. The invention relates more specifically to methods and mechanisms for representing abstract network management policies and processing such policies, including conflict resolution.

BACKGROUND OF THE INVENTION

Computer networks have become ubiquitous in the home, office, and industrial environment. As computer networks have grown ever more complex, automated mechanisms for organizing and managing the networks have emerged. These mechanisms are generally implemented in the form of one or more computer programs, and are generically known as network management systems or applications.

The behavior of some network management applications or equipment may be governed by one or more abstract policies. A network management policy expresses a business goal for use of the network; the network management application can convert the policy into instructions to network devices, such as switches, routers, and other hardware and software, to implement the policy. An example of a policy is: "All administrative assistants may use the World Wide Web only between 11 a.m. and 3 p.m., Monday through Friday." A system that can receive and act on such policies is sometimes called a policy-based network management system.

Policy-based management is used in other, specific contexts within the broad field of network management. For example, Cisco Centri Firewall software product, commercially available from Cisco Systems, Inc. of San Jose, Calif., is a policy-driven product. The use of policies to control a firewall is disclosed in co-pending U.S. patent application Ser. No. 60/074945, filed Feb. 17, 1998, entitled "Graphical Network Security Policy Management," and naming Scott L. Wiegel as inventor. Problems involved in defining and resolving conflicts of network management policies are described in co-pending U.S. patent applications Ser. Nos. 09/205,833 and 09/205,831 filed Dec. 3, 1998, and respectively entitled "Automatically Verifying Network Management Policies" and "Recognizing and Processing Conflicts in Network Management Policies", each naming as inventors John Ahlstrom and Stephen I. Schleimer.

A proposed policy networking system to be developed by Cisco Systems, Inc. is known as "CiscoAssure". Other information about policy-based networking is described in CiscoAssure Policy Networking: Enabling Business Applications through Intelligent Networking, http://www.cisco.com/warp/public/734/capn/assur sd.htm (posted Jun. 13, 1998); CiscoAssure Policy Networking End-to-End Quality of Service, http://www. cisco.com/ warp/public/734/capn/caqos wp.htm (posted Jun.24, 1998); Delivering End-to-End Security in Policy-Based Networks, http://www.cisco. com/warp/public/734/capn/deesp wp.htm (posted Sep. 11, 1998); User Registration and Address Management Services for Policy Networking, http://www.cisco.com/warp/public/734/capn/point wp.htm (posted Sep. 11, 1998); CiscoAssure User Registration Tool, http://www.cisco.com/warp/public/734/ capn/caurt ai.htm (posted Oct. 8, 1998).

Many problems in network management and policy administration can be expressed in terms of searching for a solution among a possible set of outcomes while simultaneously satisfying a set of requirements. For example, configuration of a network device must take into account parameters or variables such as software release version, types of interface, chassis, and also interoperability constraints with other networking devices. Only certain parameter values are compatible or will work together. Often compatible parameter values or configurations may be determined only by extensive study of documentation or specifications of the network devices, yet violation of these compatibility rules may cause a network failure. An example is linking together two switch ports, where a port on one side is full duplex and a port on the other side is half duplex. The network may not operate because the two ports or sides are incompatible.

These problems are especially acute in policy networking systems. A system administrator may establish two or more policies that conflict. Obscure or hidden incompatibilities may be overlooked when the policies are created. A conflict in network policies may cause network failure or undefined results.

A policy can also be represented as a set of variables that satisfy some criteria. For example, a policy might allow all packets from an electronic commerce application to have high priority whereas mass unsolicited c-mail messages must have very low priority. Thus, the variables of the policy are application type and priority level. The variables satisfy the criteria only by observing certain "constraints." In this example, the constraints are the association of e-commerce packets to high priority and e-mail packets to low priority.

The field of constraint logic programming (CLP) combines techniques from mathematics, artificial intelligence and operations research. In CLP, known elements of a problem are represented by a set of declarations, and permissible or viable solutions are found using algorithmic search methods. Generally, a Constraint Satisfaction Problem (CSP) consists of a set of variables $V=\{V_1, \ldots, V_n\}$. For each variable $V_i$, there is a finite set $D_i$ of possible values (its Domain). The CSP further comprises a set of constraints that restrict the values that the variables can simultaneously take. A solution of a CSP is an assignment of values to each variable such that none of the constraints are violated. Constraints in FINITE and DISCRETE domains can be expressed as compatibility relations between variable-value tuples stating that certain combinations are allowed or not allowed.

Further information about CLP and CSPs are provided in: V. Kumar, *Algorithms for Constraint Satisfaction Problems: A Survey*, AI Magazine 13(1):32–44, 1992; M. Sabin et al., *Constraint-Based Modeling: From Diagnosis and Configuration to Network Management*, Department of Computer Science, University of New Hampshire, Durham, N.H. 03824; M. Wallace, *Constraint Programming*, IC-Parc, William Penny Laboratory, Imperial College, London, September 1995; R. Barták, *Guide to Constraint Programming*, http://kti.ms.mff.cuni.cz/3bartak/constraints/, May 27, 1998. Further, E. Bruchez et al. of Artificial Intelligence Laboratory, Computer Science Department, Lausanne, Switzerland have implemented a general CSP solving system called *Java Constraint Library*, which is available for download online.

Based on the foregoing, there is a clear need in policy networking systems to prevent or resolve conflicts in network management policies.

There is also a need for a mechanism that can clearly express, store and enforce rules, specifications, or other statements of restrictions, requirements, or constraints on values of parameters that apply to network devices.

There is a particular need for such a mechanism in a network management system, whereby the mechanism prevents the creation or enforcement of erroneous or conflicting network management policies.

SUMMARY OF THE INVENTION

The foregoing needs and objects, and other needs and objects that will become apparent from the following description, are achieved by the invention, which comprises, in one aspect, a method of managing a network according to a plurality of network management policies, comprising the computer-implemented steps of storing each of the policies as a first constraint; storing at least one collective constraint in association with the first constraint; applying a constraint satisfaction algorithm to the first constraint to determine a solution or a set of solutions; checking whether addition of a solution or the set of solutions taken together violates any of the collective constraints; identifying a conflict in the policies when one or more of the instance or collective constraints is violated; and resolving the conflict by modifying one or more of the variables, values or restrictions.

One feature of this aspect is that storing each of the policies as a constraint comprises the steps of storing each of the policies as a constraint that comprises one or more variables, a set of possible values, and a set of restrictions on the values that the variables can simultaneously take. A related feature is that storing at least one collective constraint comprises the steps of storing one or more collective constraints in which at least one of the collective constraints is that none of the variables may interfere with one another. Another related feature is that applying a constraint satisfaction algorithm comprises the steps of applying a constraint satisfaction algorithm to the stored variables, values, restrictions, to the instance constraints to create zero or more solutions; and checking the collective constraints to test whether the new proposed solution does not conflict with any solutions already in the system.

According to another feature, resolving the conflict by modifying one or more of the variables, values or restrictions further comprises the step of adding a new constraint that defines the modified variable, value or restriction. Another feature is that storing each of the policies as a constraint comprises the steps of storing each of the policies as an instance constraint that comprises one or more variables, a set of possible values, and a set of restrictions on the values that the variables can simultaneously take. Still another feature is that storing one or more collective constraints comprises the steps of storing one or more group constraints, in which at least one of the group constraints is that none of the variables may interfere with one another.

The invention also encompasses a computer-readable medium that may be in the form of a carrier wave, and an apparatus that are configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for representing abstract network management policies and processing such policies to resolve conflicts is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Operating Context

Figure 1:
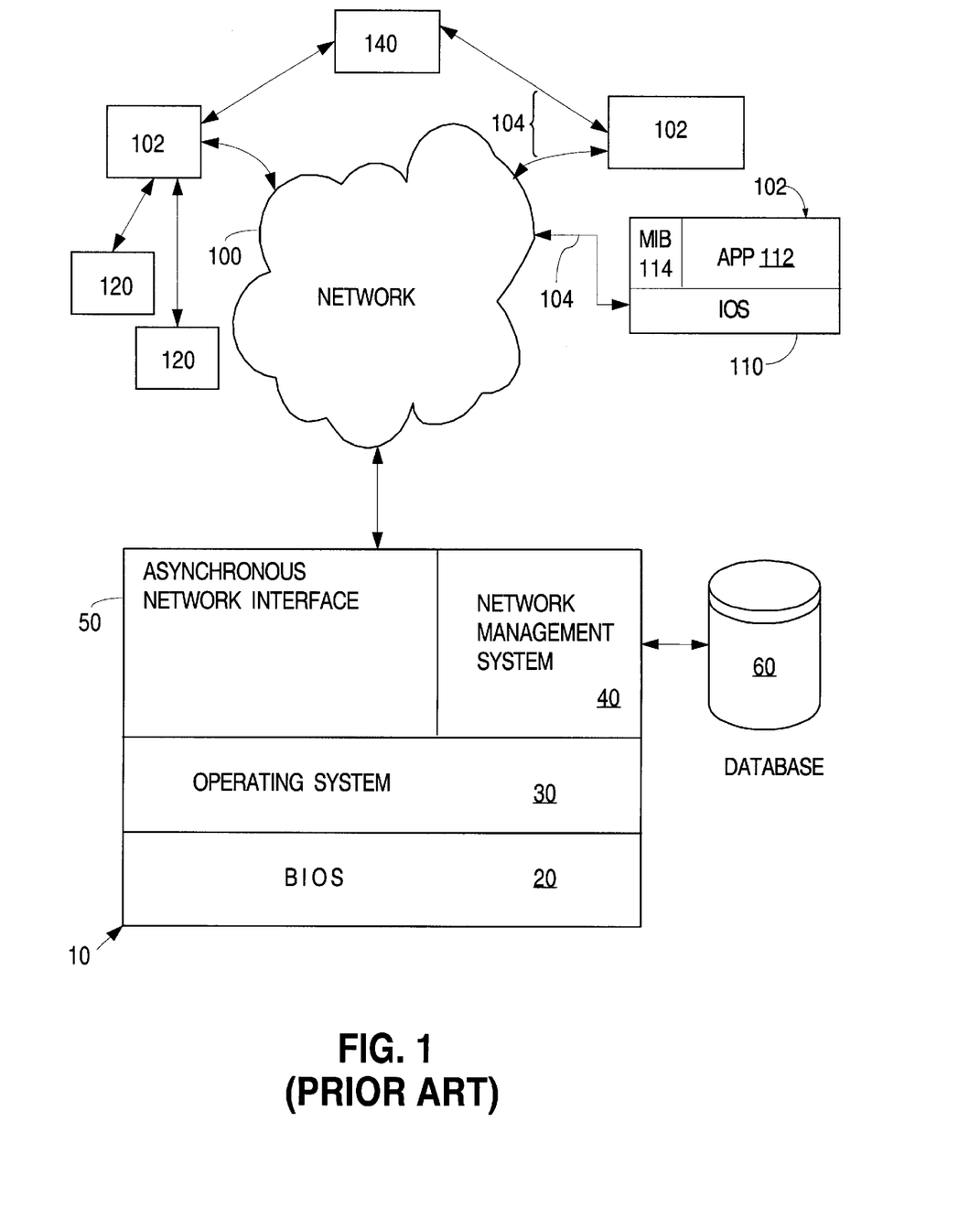
FIG. 1 is a simplified diagram of a network that is managed by a network management station.

FIG. 1 is a simplified diagram of a network 100 that is managed by a network management system running on one or more network management stations 10. The network 100 comprises one or more network devices 102, such as switches, routers, bridges, gateways, and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes a network-oriented operating system 110. An example of a network-oriented operating system is the Internetworking Operating System (IOS) commercially available from Cisco Systems, Inc. Each network device 102 also executes one or more applications 112 under control of the operating system 110. The operating system 110 supervises operation of the applications 112 and communicates over network connections 104 using one or more agreed-upon network communication protocols, such as Simple Network Management Protocol (SNMP).

Each device 102 stores information about its current configuration, and other information, in one or more forms, for example, a Management Information Base (MIB) 114. Information in the MIB 114 is organized in one or more MIB variables. The network management station 10 can send "fetch" and "set" commands to the device 102 in order to retrieve or set values of MIB variables. For information stored in other forms, there are other types of communications and commands to set and retrieve the information values.

Figure 3:
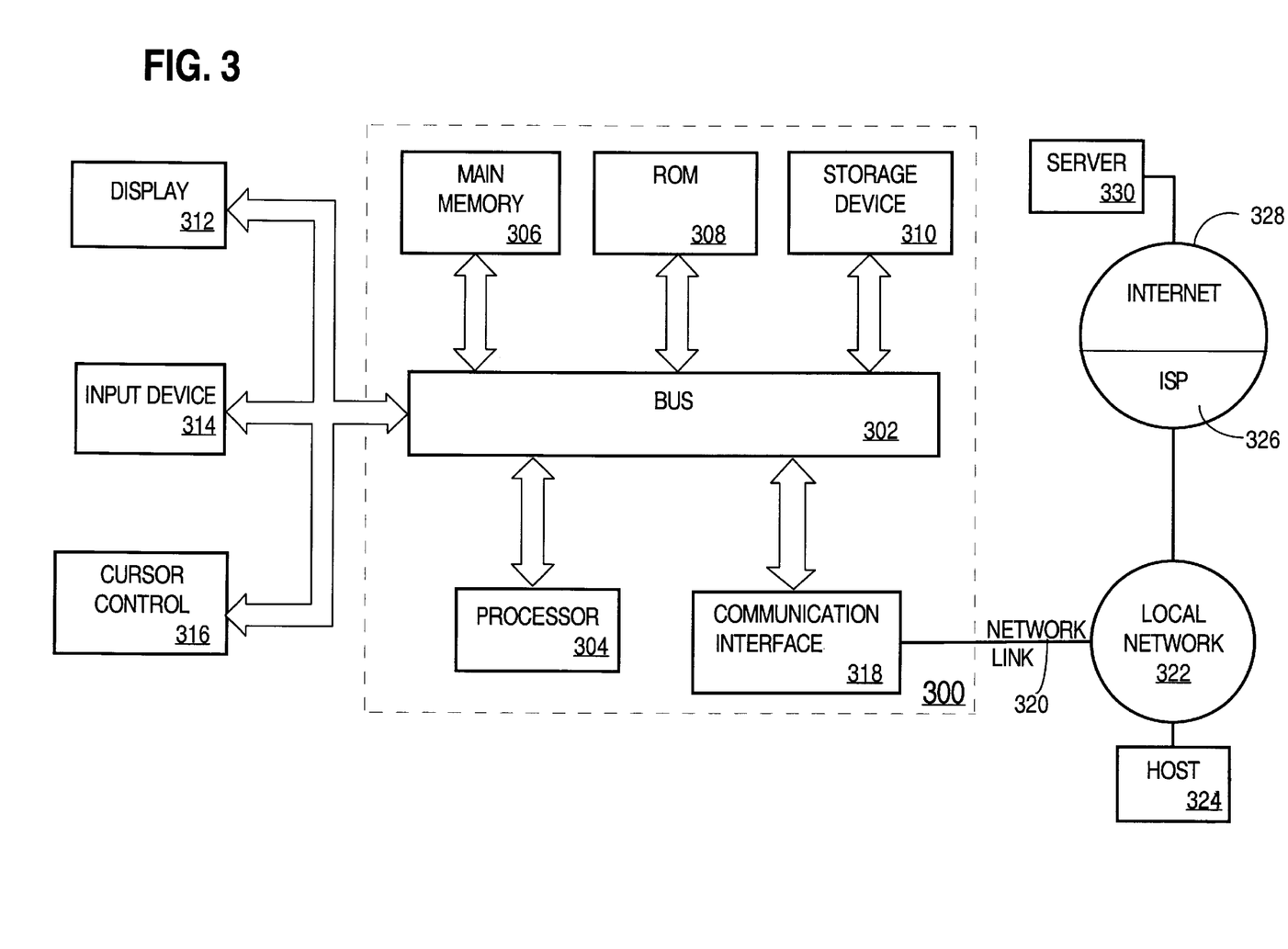
FIG. 3 is a block diagram of a computer system that can be used to implement the network management station of FIG. 1 and other aspects of the invention.

Preferably the network management station 10 is a general-purpose computer system of the type shown and described further herein in connection with FIG. 3. The network management station 10 executes one or more software components that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system. The network management station 10 may also execute other operating systems that may not require a BIOS 20, such as UNIX-type operating systems, microkernel-based operating systems, etc.

The network management station 10 executes an asynchronous network interface (ANI) 50 under control of the operating system 30. The ANI 50 provides an interface to the network 100 and communicates with the network using SNMP or other agreed-upon protocols. The ANI 50 provides numerous low-level services and functions for use by higher-level applications.

The network management station 10 executes a network management system 40 that interacts with an information base 60 containing information about the managed network 100. The information base may be implemented on one or more of: relational databases, object data bases, directories, flat file systems, ISAM file systems, etc. The network management system 40 is an example of a network management application. Using a network management application, a manager can monitor and control network components. For example, a network management application enables a manager to interrogate devices such as host computers, routers, switches, and bridges to determine their status and to obtain statistics about the networks to which they attach. The network management application also enables a manager to control such devices by changing device configuration or operation information, for example, routes and configuring network interfaces. Examples of network management applications are CiscoWorks, CiscoWorks 2000, and CiscoView, each of which is commercially available from Cisco Systems, Inc.

The ANI 50 and network management system 40 need not execute or reside on the same physical computer. They may execute on different machines. There need not be only one ANI 50 or only one network management system 40.

Overview of Constraint Satisfaction Problems

A Constraint Satisfaction Problem ("CSP") has a fixed finite number of problem variables, each variable having a finite set of possible values it can take (called its domain). The constraints between the variables can always be expressed as a set of admissible combinations of values.

Generally, a CSP consists of:

A set of variables V={$V_1, \ldots, V_n$}.

For each variable $V_i$, a finite set $D_i$ of possible values (its domain), And a set of constraints restricting the values that the variables can simultaneously take.

A solution of a CSP is an assignment of values to each variable such that none of the constraints are violated. Constraints in FINITE, and DISCRETE domains can be expressed as compatibility relations between variable-value tuples stating that certain combinations are allowed or not allowed.

For example, consider a finite CSP having variables "Software_Version", "VLAN Spanning Tree Status", and "IsFastEtherChannel." Assume that these variables may take on values as specified by the following domains:

Software_Version {<2.3 2.3,>=3.1}

VLAN Spanning Tree Status {enabled, disabled}

IsFastEtherChannel {true, false}

Assume further that the specifications of one or more network devices, or a particular software element of a network, impose certain limits on the compatibility of the above variables. For example, assume that the Fast EtherChannel service requires software version 2.3 or above. For software version 2.3, the spanning tree must be disabled so that there will not be a looped topology. However, for software version 3.1 and above, spanning tree status is compatible with Fast EtherChannel ports.

These specifications may be expressed as constraints, as follows. Each constraint is expressed as a NOT-ALLOWED or No Good ("NG") tuple.

Constraint 1: NOT(<2.3, true)

Constraint 2: NOT(2.3, true, enabled)

By comparing the total number of possible solutions against the constraints, the following allowed solutions are found:

(<2.3, false, enabled)
(<2.3, false, disabled)
(2.3, true, disabled)
(2.3, false, enabled)
(2.3, false, disabled)
(>=3.1, true, enabled)
(>=3.1, true, disabled)
(>=3.1, false, enabled)
(>=3.1, true, disabled)

There are nine allowed solutions and a total of twelve possible combinations. Thus, three combinations were eliminated by the constraints.

Applying Constraint Problems to Network Management

1. Overview

The desirable configuration of a set of network devices can be modeled as a CSP. Violating solutions indicate a configuration error. Often, the constraint that is violated points to the problem.

For example, assume that the variables and constraints described in the preceding section are defined. Assume further that a network management system determines that a particular network is configured with a FastEtherChannel port with spanning tree enabled. According to the constraints, the network must have software version 3.1. If the network management system further determines that the network is running software version 2.3, the network management system should identify or report a discrepancy, or violation of a constraint. To fix the problem, the system or an administrator of the network must change one or more variables, until the entire tuple is in the allowable solution space. In this example, when the network management system constructs the tuple (2.3, true, enabled) (which is illegal), it can change either the software version to 3.1, or unset the port from channeling, or disable the spanning tree operation on that port.

Finding all solutions to a Finite CSP problem is NP-complete. However, testing whether a particular proposed solution satisfies the constraints is simple, and the required processing time increases only linearly as the number of constraints increases. The search space may be limited in the network management context if a proposed solution exists, e.g., the current configuration, and the system may only need to test whether it is correct. Likewise, the system may only need to test whether a proposed change in configuration is valid.

In these cases or others, once the system identifies the violated constraint, the system has identified a probable cause for the problem. The system or an administrator may then start from the proposed solution, and backtrack to a correct solution by changing one or more of the variables. The system or the administrator need not enumerate every single solution, since they only need a working configuration. Further, the system or the constraints may define precedence rules that state the order in which values of variables should be changed. For example, it may be preferable to modify the spanning tree status variable before the software version variable, because upgrading software images is harder. Various search algorithms are known, some of which combine forward checking with backtracking or back jumping, and various heuristics on value and variable ordering. For practical purposes, forward checking and simple backtracking are used in may applications.

In the example above, suppose that software version 3.1 is not released yet. Then a device that attempted to run a Fast EtherChannel port with spanning tree enabled would violate the first constraint, "NOT(2.3, true, enabled)". The device would not violate the second constraint, "NOT(<2.3, true)". This configuration would be flagged, and the violated constraint would be used to identify the problem. Changing one or more variables in the proposed solution may result in a solution satisfying all of the constraints. For example, updating the software to release 3.1, or disabling spanning tree, or not configuring the port to run Fast EtherChannel, each may result in a solution that satisfies all constraints.

Another advantage of representing network management knowledge using CSP is that when a new device, parameter, or compatibility rule is created, neither the system nor its administrators need to review the existing constraints and change them. The system or an administrator may add some more constraints that either disallow or allow a particular behavior. Examples are set forth in the next section.

A dynamic constraint satisfaction problem (DCSP) extends constraint satisfaction to problems in which the set of constraints to consider evolves during problem solving. In a static CSP, the variables, domains and constraints are completely known and fixed at the beginning of the search. In a networking environment, however, the variables and constraints may evolve as time passes. Users may add, change, delete, or relax constraints. Dynamic CSP techniques allow a problem solving process to reuse a previous solution after a change in the constraint network. Conflicts can be found, where a constraint is violated, and repaired using DCSP. Furthermore, solving a problem from scratch after a change does not guarantee a subsequent solution that is close to the previous solution, because a small change in initial conditions may cause a large change in the solution. Hence, it is always better to start from a known solution and adapt that solution to resolve conflicts.

2. Application to Policy Networking

A "Policy" is a declarative statement of intention about how a policy-driven system shall be configured or behave. A policy may be expressed in terms of a Policy Condition and a Policy Consequent. When the Condition is met, the Consequent is performed. More specifically, policy statements are declarative statements made by network administrators defining conditions and actions or states of affairs they want taken or established when the condition is fulfilled by something in the network. For example, a Policy is:

If source in [TrainingServers] & destination in [ClassRooms] & time between [700 & 1759] then VideoLT100

Generally, a Policy Condition is a Boolean expression defining the situation under which the policy system is to attempt to establish the consequent. The Condition is a Boolean expression that may comprise relations between Condition Categories and Condition Elements. Condition Categories may be predefined kinds of things that can be evaluated in conditions, for example, service, user, time, and other things. Condition Elements are customer-defined values of predefined categories of "things" in or about the network. A Policy Consequent is a state of affairs that is to be brought about when the policy condition is satisfied, or an action that is to be taken or attempted when the policy condition is satisfied.

A set of policies can be represented and processed as a collective set of solutions to a constraint satisfaction problem. There is an additional constraint on the collection of solutions that they may not "interfere" with each other. Therefore, even though each individual solution does not violate any constraints between its allowable values, it is possible that the collection taken together cannot be satisfied. For example, suppose the variables are Application and Bandwidth Allowed and have the following possible values (Domains):

Application {e-mail, e-commerce}
Bandwidth Allowed {10, 100} (where 10, and 100 are units of some sort)
Assume further that there are three (3) allowable constraints:
[1] (e-mail, 10)
[2] (e-commerce, 10)
[3] (e-commerce, 100)

These constraints reflect a network management policy that any e-mail application is allowed 10 units, but not allowed 100 units, and that any e-commerce application is allowed either 10 units or 100 units.

Now these constraints are applied to individual mailservers and e-commerce servers within a hypothetical network. In this respect, the CSP is extended in that variables are instantiated and solutions are checked. The variable e-mail is a generic type. When the policy is applied to a specific instantiation of c-mail to a particular mail-server and allow it a unit of 10 in bandwidth, the result is tuples such as (mail-server1, 10), (ecommerceserver2, 100), (mailserver2, 10). Each of the instantiated tuples satisfies each of the individual constraints.

A collective constraint, however, may be unsatisfied. For example, assume that there is a collective constraint, namely that the total of the bandwidth allowed must be less than 500. If this collective constraint is not stated or enforced, the system could easily become oversubscribed. Thus, in this document, a Collective Constraint Satisfaction Problem (CCSP) is described as a CSP in which the collection of instantiated variables must satisfy additional collective constraints. In previous constraint satisfaction problems, the domains over which the variables must satisfy are enumerated as types or classes. For example, email is generic, as is e-commerce. The instantiated variable mailserver1 is an instance of type e-mail. Thus, the collective constraint is applied to the instantiated solutions, each of which may be valid by itself, but not valid collectively.

Policy Networking Using Collective Constraint Satisfaction

Figure 2A:
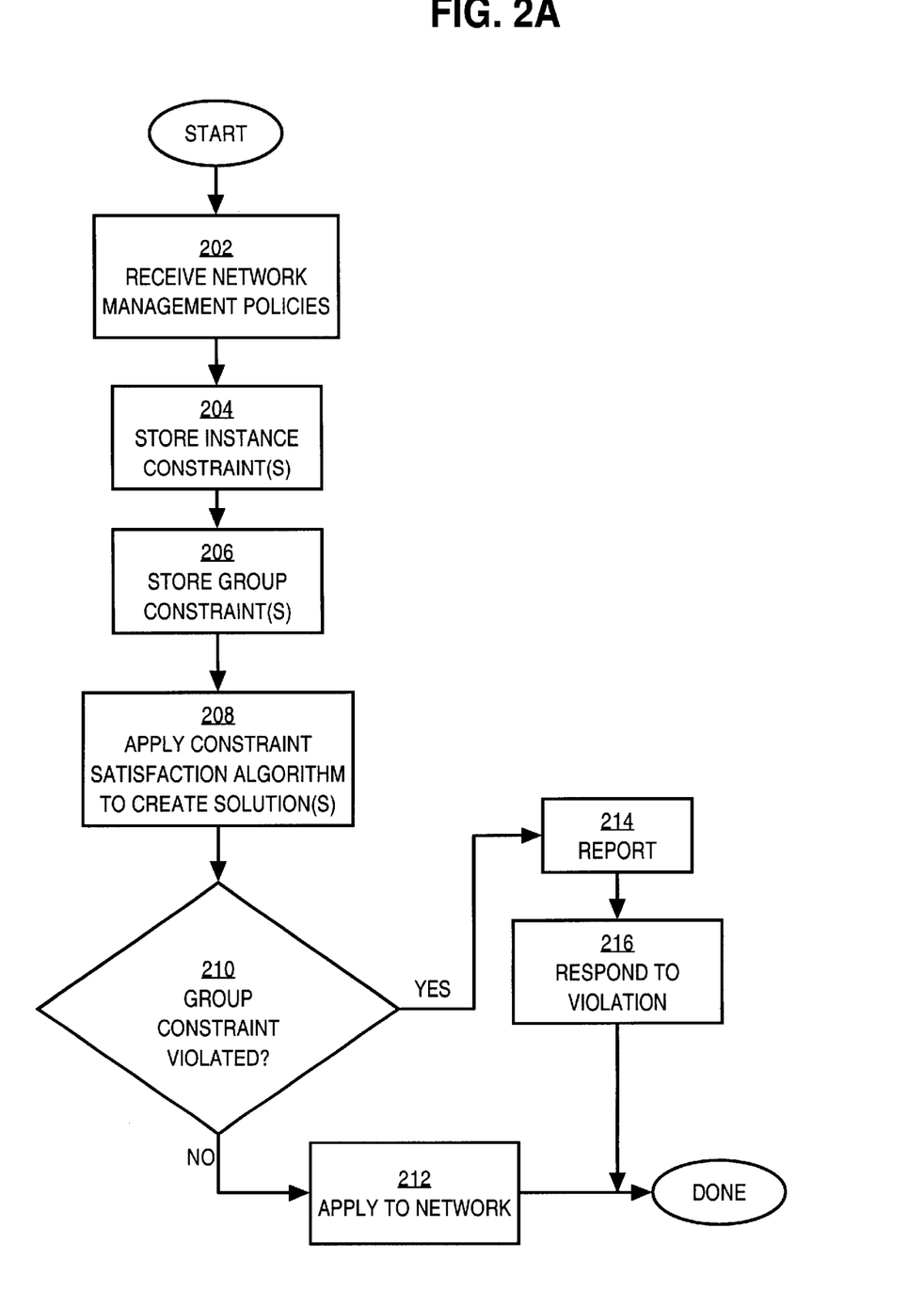
FIG. 2A is a flow diagram of a process of resolving conflicts in network management policies.

FIG. 2A is a flow diagram of a preferred embodiment of a process of policy networking using collective constraint satisfaction.

The process of FIG. 2A may be implemented in the form of one or more computer programs, processes, objects, modules, routines, or firmware. Alternatively, the process of FIG. 2A may be implemented in hardware, for example, in an application-specific integrated circuit (ASIC) or in the hardware of a router, switch or other network device. The particular mode of implementation is not important, provided that the process can interact with one or more abstract network management policies, which define how one or more network devices of one or more networks or sub-nets are managed. In one embodiment, the process of FIG. 2A forms a part of a larger network management system, such as network management system 40 of FIG. 1.

In block 202, one or more network management policies are received. Block 202 may involve defining the network management policies using a policy editor or other tool that is associated with a network management system. Block 202 may also involve providing a file of policy descriptions to the process. The particular mode of implementation is not important. What is important is that the process receives a description of one or more abstract network management policies in a form that can be processed by machine or by software.

Block 202 also may involve storing, in an initialization phase, names of all allowed variables and all allowed values that can be taken on by the variables. Thus, all defined variables and their domains are stored.

In block 204, one or more instance constraints are stored. The instance constraints represent the network management policies in terms of variables and domains of allowable values. In block 206, one or more collective constraints or group constraints are stored.

Block 204 and block 206 may involve, for example, a computer implementation of the following process: Let V be a set of variables (attributes). Let D be a set of domains where $V_i$ takes on a value in $D_i$. Let X be a tuple $(x_1, \ldots, x_n)$ where $x_i = v_i \epsilon D_i$ represent an instantiation of the allowable values of $V_i$. A conventional constraint satisfaction problem would describe the interactions between the values of $v_i$ that are allowed or disallowed between a single instance $X_j$. In contrast, a method of collective constraint satisfaction, as implemented in an embodiment, has one or more "collective constraints" such that the set $\{X_j\}_{j=1,p}$ (p=number of instances) cannot violate.

Thus, a particular solution $X_j$ may satisfy all of the constraints between its attributes $\{x_i\}_{i=1,n}$ (n=number of variables), yet the collection of solutions $\{X_j\}_{j=1,q}$ (q=number of solutions) may violate constraints placed on the collective.

The constraints between attributes or variables are called "instance constraints." Collective constraints also are called "group constraints." A group constraint may reflect an abstract policy, such as "only one type of traffic is allowed on an interface." Preferably, instance constraints and group constraints are stored in one or more database tables that are organized by variable and value.

In block 208, a constraint satisfaction algorithm is applied to the instance constraints to create one or more proposed solutions. The constraint satisfaction algorithm may be one of the algorithms available in E. Bruchez et al.'s Java Constraint Library. Each solution is a tuple that identifies an allowable combination of one or more variables and a value that each of the variables can take.

Instance constraints that are already in the system, or have been accepted, are stored. In block 210, the process tests whether any of the group constraints is violated by the set of new proposed solutions in conjunction with what is already in the system. If none of the group constraints is violated, then the proposed solutions are marked or re-defined as a set of allowed solutions and placed into the storage of instances in the system so that they may be applied. Control is passed to block 212, in which each of the allowed solutions is applied to the network. Block 212 may involve, for example, changing the configuration of one or more network devices according to the allowed solutions, or providing the allowed solutions to other elements of network management system 40, other software elements, or other hardware components for further processing. The particular mode of implementation is not important. What is important is that the allowed solutions have some tangible effect on the managed network or its network management system or software.

If a group constraint is violated, then control is passed to block 214, in which the violation is reported in some fashion. For example, block 214 may involve reporting an error message to a user or administrator of the system. Block 214 may also involve reporting an error message to another software element or process, or raising an error condition that is returned as an error code. Block 214 may also involve storing an error record in a log file for later review or use by other processes.

In some embodiments, the process then responds to the violation of a group constraint, as shown in block 216. For example, the process may reject the new proposed solution, or accept the new proposed solution and reject the solution that is being interfered with, or modify either the new proposed solution or modify the solution that is being interfered with. Block 216 may involve prompting a user or administrator to review the existing instances with the ones that conflict with the proposed solution highlighted. This way, the user can decide whether to accept the new proposed instance at the expense of the existing solutions, or to reject the new proposed solution.

To further illustrate the foregoing process, assume that a network management system includes the following variables:

Variable : interfaceIP, over Domain={valid IP address}

Variable: interfaceID, over Domain={valid interface identifier, i.e. e0, s1, t0, . . . }

Variable: Queuing strategy, over Domain={FCFS, PQ, CQ, WFQ, WRED}

Variable: IOS Version, over Domain (valid IOS version, i.e. 10.0, 11.0, 11. 1, etc)

These variables and values are stored in the initialization phase in block 202. Assume further that the system, or one or more abstract policies that are used to manage network devices of a managed network, defines the following constraints:

Instance Constraint(1): PQ and CQ available on IOS versions 10.0 and up, WFQ available on IOS versions 11.0 and up, and WRED available on IOS 11.2 and up Instance Defaults: Queuing strategy: serial interfaces at E1 or below=WFQ, all others=FCFS Group Constraint(1): only one Queuing strategy is allowed on an interface.

These constraints are stored in block 204 and block 206. In an embodiment, application of the constraint satisfaction algorithm in block 208 causes the system to enforce the foregoing constraints by computing a solution $X_1$=(172.23.22.46, e1, PQ, 11.0). This solution satisfies the Instance constraints. The system may also compute a proposed solution $X_2$=(172.23.22.46, e1, WRED, 11.0). In block 210, checking through the Instance Constraints, the system determines that the proposed solution violates the Instance Constraint(1) in which WRED is available on IOS 11.2 and up, so the system rejects $X_2$ as a proposed solution.

In block 208 the system may also compute another proposed solution $X_3$=(172.23.1.18, e0, FCFS, 11.3). The proposed solution violates none of the Instance Constraints, and also does not violate the Group Constraint. Accordingly, $X_3$ is accepted and stored among the allowed solutions.

The system may also compute another proposed solution $X_4$=(172.23.22.46, e1, WFQ, 11.0). The system first checks that $X_4$ does not violate any Instance Constraints. Then the system checks $X_4$ against $X_1$ and determines that $X_4$ violates the group constraint(1). In response, the system notifies the user of a possible conflict. In one embodiment, the user may replace $X_1$ with $X_4$, or the system rejects $X_4$.

Describing and processing a policy conflict problem in a network management system as a CCSP allows great flexibility in adding new policies and constraints. For example, assume that the following constraints are added to the foregoing system:

Instance Constraint(2) (172.23.22.46 must run 11.0)

Group Constraint(2) (all interfaces on the same subnet must run WRED on their Ethernet interfaces)

Suppose the system computes a solution set that consists of $X_1$=(172.23.22.46, e1, PQ, 11.0) and $X_3$=(172.23.1.18, e0, FCFS, 11.3). This example assumes that the subnet mask is 255.255.255.0 and hence $X_1$ and $X_3$ are both Ethernet interfaces but are not on the same subnet to each other. Therefore Group Constraint(2) is not violated. Both of these solutions do not violate any of the constraints. Then the system computes another solution:

$$X_5=(172.23.22.45, e0, WFQ, 11.0).$$

The Instance constraints are all satisfied, however, the group constraint(2) is violated. Now, because the network under management has two interfaces in the same subnet, 172.23.22.X, the system may suggest the application of group constraint(2) and force them all to run WRED. However, this constraint conflicts with the Instance Constraint(2) that 172.23.22.46 must run IOS 11.0, since 11.0 is not compatible with WRED. The violated constraints identify the conflict. In this case, the addition of $X_5$ caused $X_1$ to propose changing to $X_{1=}$(172.23.22.46, e0, WRED, 11.0) which violates the Instance Constraint(1): WRED available on IOS 11.2 and up. Therefore, in the test of block 210, the system determines that Group Constraint(2) conflicts with Instance Constraint(2). The user may be asked to either relax one of the conflicting constraints, or redefine one of them. As an example, the user may delete Instance Constraint(2), or redefine Group Constraint(2) to be (All Ethernet interfaces must run WRED). Deleting Instance Constraint(2) widens the solution space, whereas the redefinition of Group Constraint(2) narrows it, because now, $X_1$ and $X_3$ are no longer legal solutions and $X_5$ would not have been proposed. Accordingly, in block 214, the conflict may be reported to the user or to a network administrator through any appropriate means, such as an error message or log entry.

According to a preferred embodiment, a network management system stores and manages one or more policies as a set of constraints with additional collective constraints. Using this representation, in block 210 the system may detect a conflict between a proposed policy setting and the current state by using the collective constraints. A proposed policy setting may be submitted to the system at block 202, or through another mechanism, for example, by encapsulating the steps of block 208 and block 210 as a subroutine that may be externally called by another process. The conflict happens when a group constraint that was previously satisfied is now violated. When a conflict arises after a new policy is added, the new policy may be determined to be the cause of the conflict, and the system may use a limited search algorithm to suggest an alternative solution that satisfies all of the group constraints. If after trying all of the possible solutions that satisfies instance constraints, a violation of the group constraint still exists, the system or a user may conclude that it cannot admit any new policies into the system, unless one or more of the existing policies are deleted, after which it tries the process again.

The following describes what happens if a policy set is too restrictive (irrespective of the individual solutions). Here is a situation where there is a conflict within the set of policies (constraints) themselves.

For example:

Instance Constraint(1): Engineers must use mailserver1 (or engineers are associated with mailserver1)

Instance Constraint(2): Users of Mailserver1 are allowed Internet access (or users of mailserver1 are associated with allowed access)

Instance Constraint(3): Engineers are not allowed Internet access (or engineers are associated with disallowed access)

Instance Constraint(4): Users of Mailserver2 are allowed Internet access

Instance Constraint(5): Users of Mailserver2 are disallowed Internet access

In this case, there is no solution involving engineers that satisfies the three constraints. The variables are:

job-title over the domain (engineer)

mail-servers over the domain (mailserver1, mailserver2)

internet-access over the domain (allowed, disallowed)

The constraints are:

1) (engineer, mailserver1)

2) (mailserver1, allowed)

3) (engineer, disallowed)

4) (mailserver2, allowed)

5) (mailserver2, disallowed) [note: this means mailserver2 doesn't care]

Allowed solutions are:

NONE

There are no solutions that can simultaneously satisfy the above constraints. In particular, constraints 1, 2, and 3 interfere with each other. There are several ways this situation can be fixed:

1. Relax the restriction so that engineers may use any mailserver by adding another constraint (engineer, mailserver2)

2. OR allow mailserver1 to deny Internet access by adding another constraint (mailserver2, disallowed)

3. OR allow engineers access to the Internet by adding another constraint (engineer, allowed)

In case 1, the solution (engineer, mailserver2, disallowed) works. In case 2, the solution (engineer, mailserver1, disallowed) works. In case 3, the solution (engineer, mailserver1, allowed) works. Thus, the problem may be fixed in three different ways. The policies taken together were in conflict and there were no possible solutions. By adding additional constraints, the solution space is enlarged and a solution is allowed, although each solution is different depending on how the policies are modified). Notice that in this case there were no collective constraints.

To demonstrate use of collective constraints, suppose "manager" is added to the domain of job-titles, and suppose Case 1 is extended to allow engineers on mailserver2. The following constraints are in the system:

1) (engineer, mailserver1)
2) (mailserver1, allowed)
3) (engineer, disallowed)
4) (mailserver2, allowed)
5) (mailserver2, disallowed)
6) (engineer, mailserver2)
7) (manager, mailserver1
8) (manager, allowed)
9) (manager, mailserver2)

An example of an instantiation is: suppose Clare and Steve are engineers and Anne is a manager. Then the following are all solutions satisfying the constraint problem:

Solution 1) (Clare, mailserver2, disallowed)
Solution 2) (Anne, mailserver1, allowed)

Individually, each solution is valid. Now add a group constraint such that for all instances satisfying the CSP, Group Constraint (1): Engineers and managers must be on the same mail-server.

To check the group constraint, the set of solution instances is taken together and evaluated. Solution 1) violates no instance constraints and no group constraints. Solution 2) violates no instance constraints, but taken together Solution 1) conflicts with Solution 2) because of the Group Constraint (1).

This is an illustration of a set of instance constraints that do not conflict, but taken together with a group constraint, they do conflict. For example, if Solution 1) was proposed first, the solution set would consist of only Solution 1). It is accepted because it did not conflict with anyone, there was nobody else in the set. Assume that Solution 3) was proposed next, wherein Solution 3)=(Steve, mailserver2, disallowed). Solution 3 does not conflict with Solution 1) and is accepted. Now, Solution 2) is proposed, and it conflicts with both Solution 1) and Solution 3) because of the group constraint. At this point, either Solution 2) is rejected, or Solution 1) and Solution 3 are thrown out in favor of Solution 2, or the group constraint is modified or deleted, or an instance constraint is added to enlarge the solution space.

Case 1) Modify or Delete the Group Constraint.
Case 2) Add another instance constraint to enlarge the solution space.

Assume that Case 2) is followed, and a new instance constraint is added, namely:

Constraint (10) (engineer, mailserver1, allowed) which means that an engineer, when assigned to mailserver1, is allowed access. Seemingly Constraint (10) would conflict with Constraint (3), but this is because in proper constraint format, Constraint (3) should have said, Engineer is associated with non-access to the Internet. Constraint (10) says that engineers on mailserver I are associated with allowed access. Constraint (10) merely enlarges the solution space.

Accordingly, the solution space consists of:
(manager, mailserver1, allowed)
(manager, mailserver2, allowed)
(manager, mailserver2, disallowed)
(engineer, mailserver2, disallowed)
(engineer, mailserver1, allowed)

Suppose Solution 1) and Solution 3) are still present in the system, and a user or the system wishes to add Solution 2). Solution 2) conflicts with Solution 1) and Solution 3). Now that an additional constraint exists, namely Constraint (5), Solution 1) and Solution 3) may be changed so that the set of solutions {1, 2, 3 } all conform to all of the constraints.

Therefore,
Solution 1) becomes (Clare, mailserver1, allowed)
Solution 2) is (Anne, mailserver1, allowed)
Solution 3) is (Steve, mailserver1, allowed)

Another constraint (manager, disallowed) could have been added to accomplish the conflict resolution. This would have changed the solution set to:
Solution 1) (Clare, mailserver2, disallowed)
Solution 2) (Anne, mailserver2, disallowed)
Solution 3) (Steve, mailserver2, disallowed)

Figure 2B:
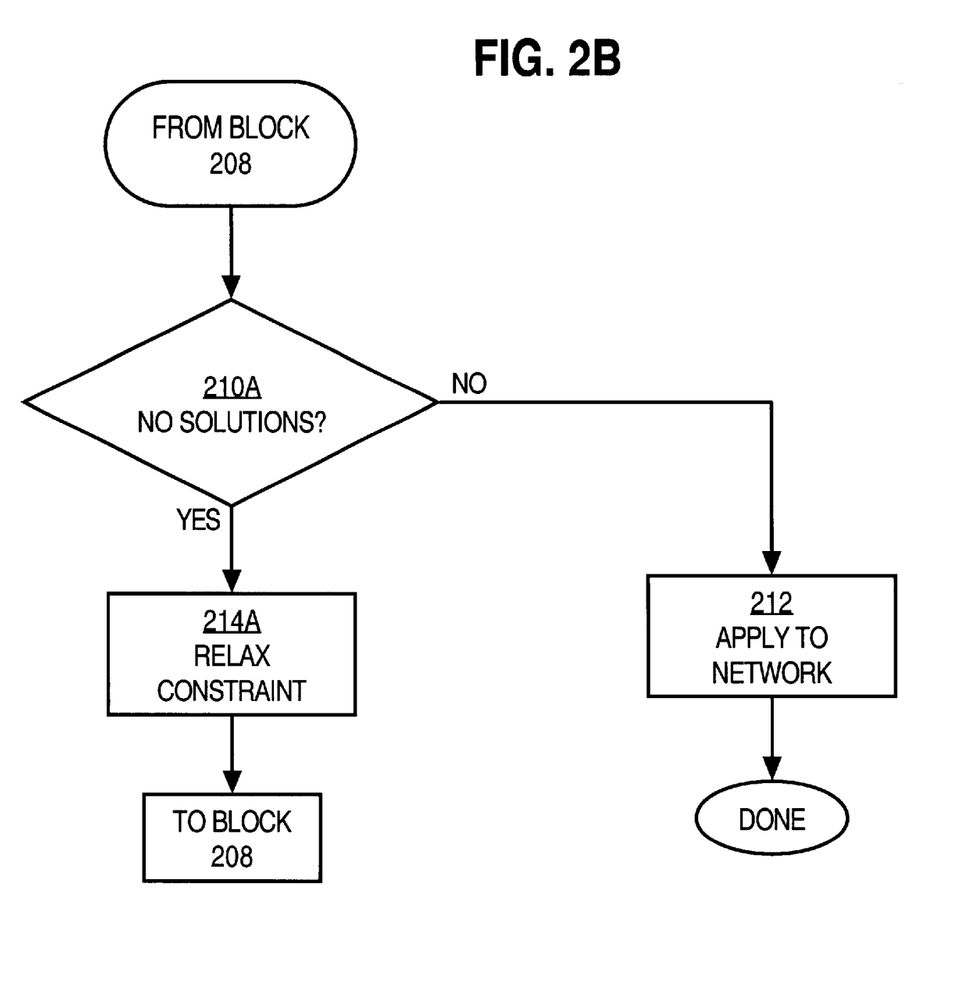
FIG. 2B is a flow diagram of an alternative embodiment of certain steps in the process of FIG. 2A.

FIG. 2B is a block diagram of an alternate embodiment of steps that may be carried out starting at block 210 of FIG. 2A. In this embodiment, policy rule conflict is defined to occur when the constraint satisfaction problem is over-constrained, that is, there is no possible solution given the constraints. Thus, as shown in FIG. 2A, block 210A may alternatively involve testing whether the algorithm applied in block 208 yields no solutions. In response, the method may relax the constraints, as shown in block 214A. Relaxing the constraints may involve automatically modifying a constraint to permit an otherwise non-allowed variable value.

Alternatively, at block 214A it is theoretically possible to allow a partial solution. Allowing a partial solution may involve defining, as a solution, a tuple that contains values for some but not all the variables defined in the system. In general when allowing a partial solution, by definition, the likelihood of policy violation for the partial solution is high. This is because the unspecified variables, having been in conflict with another policy, will either continue to conflict, or may end up in an impossible situation. Therefore allowing partial solutions is primarily of theoretical interest. Preferably, system re-examines the solution space that is overly constrained, and adds additional constraints to enlarge the solution space. This is equivalent to deleting NG constraints (NOT constraints).

In either case, the system has determined that a conflicting set of policies exists, and determines that there is a need to revise the policy set.

Advantages Over of Rule-based Deduction Systems

In past approaches, network management systems have enforced policies by means of one or more rules that reflect the policies. How to enforce a policy is determined by reviewing the rules and deducing a solution. There are several characteristics of rule-based deduction systems that make them difficult to work with. First, They presuppose a static world where nothing that is shown to be true can ever become false. Second, conflict resolution requires rewriting of rules, or rule ordering. Third, maintenance and verification is extremely difficult because the knowledge relating to a single entity is spread over several rules and modifications to rules must be checked for interactions with other rules.

The following examples illustrate why a constraint-based knowledge representation is preferable.

EXAMPLE 1

Static World

Assume that the problem relates to a school environment having dress codes that dictate what students wear. Boys must wear pants and girls must wear dresses. Boys and girls must sit on opposite sides of the school bus. These policies may be expressed as the following formal rules:

1. IF wears pants THEN is a boy.
2. IF wears dress THEN is a girl.
3. IF is a girl THEN sit on right hand side of bus.
4. IF is a boy THEN sit on left hand side of bus.

Chaining this set of rules produces the deduced rule that pant wearers sit on the left hand side of the bus and dress wearers sit on the right hand side of the bus. Formulated in terms of constraints, the problem has the following variables:

Gender={girl, boy}
Clothes={dress, pants}
Seating={left, right}

The constraints are:

{(girl, dress), (boy, pants), (girl, right), (boys, left)}.

Legal solutions are:

(girl, dress, right)
(boy, pants, left)

Thus, if a system that enforces the legal solutions knows only one attribute, the system can determine the remaining values of the tuple. For example, if the system is informed that a person is sitting on the right, the system immediately determines that the person is wearing a dress and that is a girl. A rule-based system cannot accomplish this, because there is no rule that relates clothing type to position on the bus.

Now assume that the managed environment changes, so that some girls wear pants. In the rule-base, the first two rules become untrue and inconsistent. The system cannot determine whether a person is a boy or a girl based on what they are wearing. Further, the system cannot assign someone to the right or left side of the bus because of what they are wearing, because the first two rules are unavailable. In the constraint problem, however, a system administrator may add the allowable pair (girl, pants) to the set of constraints, which becomes:

{(girl, pants), (girl, dress), (boy, pants), (girl, right), (boy, left)}.

In this situation, the constraints associate a dress wearer with a girl, and also associate a pants wearer with a girl. The possible solutions to this problem are:

(girl, pants, right)
(girl, dress, right)
(boy, pants, left)

The system has retained the information concerning clothes, and can immediately infer that a boy must be wearing pants and sitting on the left, that a dress wearer is a girl and sitting on the right, and that anyone sitting on the left must be a boy and wear pants. Thus, by using a constraint-based representation, the system has a more useful model of the problem and does not lose information. New and changed knowledge can be integrated with old knowledge in a constraint-based system without losing existing knowledge.

EXAMPLE 2

Conflict Resolution

In this example, assume that a network administrator has developed the following policies for use in managing a network that is used by persons such as engineers, provides Internet access and other services, and is available from locations such as a technical library:

1. IF engineer THEN no Internet access.
2. IF in the library THEN allow Internet access.

These policies conflict when an engineer attempts to obtain Internet access from a terminal that is located into the library. Should the system grant the engineer Internet access because that the engineer is in the library, or deny access because engineers are not given Internet access? In a rule-based network management system, conflicts are resolved by either adding and enhancing the rule, or by ordering rules or giving one rule precedence over another. Enhancing the rules creates the following:

3. IF engineer AND NOT in the library THEN no Internet access.

Using precedence, the rules are processed in the following order, and the system stops when a consequent is an action with no further condition for chaining.

1. (Policy 2) IF in the library THEN allow Internet access.
2. (Policy 1) IF engineer THEN no Internet access.

Adding and refining the rule becomes a problem when there are many conflicts and exceptions that need to be made. A rule may rapidly expand to include many ANDs, ORs, and NOTs in the antecedent and become unintuitive. Reordering rules is difficult to track when there are many rules, and can have unintended consequences. Further, dependence on ordering is fraught with unintended perils. This is especially true if a rule needs to be changed near the beginning of the order.

A constraint satisfaction process can represent and process the policies without resorting to refinement or strict ordering. Let the variables and domains be:

Job Title {Engineer, Not an Engineer}
Location {Library, Not in Library}
Internet Access {Permit, Deny}

Let the negative constraints be:

{3(Engineer, Permit), 3(Library, Deny)}.

The allowable solutions are:

(Engineer, Not in Library, Deny)
(Not an Engineer, Library, Permit)
(Not an Engineer, Not in Library, Permit)
(Not an Engineer, Not in Library, Deny)

There are eight possible combinations or outcomes. By enforcing the constraints, the system reduces the eight possible solutions to four. Further, no solution allows engineers into the library, and therefore a conflict cannot arise. A process based on a CSP enforces a correct configuration where there are no conflicts. Thus, a constraint-based representation does not allow conflicting configurations because the all allowed variable-value combinations are explicitly mentioned. When an existing configuration is analyzed, a conflict can be discovered as a non-valid solution.

In this example, a remaining problem is processing access requests by engineers who are in the library. Assume the following new variables and constraints:

Job Title {Engineer}
Location {Library}
Internet Access {Permit, Deny}

The allowable combinations are:

{(Engineer, Deny), (Engineer, Library), (Library, Permit)}

At this point, the CSP is over-constrained, as there cannot be a set of values that satisfy all of the constraints. An over-constrained CSP illustrates a conflict.

An over-constrained CSP has no solutions. Therefore, in a preferred embodiment, the process relaxes or weakens the problem until solutions can be found. In one embodiment, constraints are established in a constraint hierarchy by specifying classes of constraints, hard and soft. Hard constraints are required and must hold, whereas soft (preferential) constraints should be satisfied as much as possible depending on the criterion used. In this case, for the library policy to have preference, (Library, Permit) is made a hard constraint, and (Engineer, Deny) is made a soft constraint.

EXAMPLE 3

Maintenance Problem

Suppose a managed network has the following policies governing managers and engineers, access ports and Internet access. A rule-based system is set up to determine, based on job title, what kind of access port to assign a person and whether to permit or deny him Internet access. Three variables {Job Title, Access Port, Internet Permission} have the following Domains:

Job Title {Manager, Engineer}
Access Port {Switch, Hub}
Internet Access {Permit, Deny}

The following rules are applied:

RULE SET #1:
1. IF Access Port=Switch THEN Internet Access=Permit
2. IF Access Port=Hub THEN Internet Access=Deny
3. IF Job Title=Manager THEN Access Port=Switch
4. IF Job Title=Engineer THEN Access Port=Hub Rule chaining produces consistent results. Although there is no explicit policy that relates Job Title and Internet Access, by processing the foregoing rules, the system effectively enforces the deduced policy that Engineers are not allowed Internet Access and Managers are allowed Internet Access. But this is an accident resulting from the deduction system.

Now assume the policies are expressed as constraints, as follows.

CONSTRAINT SET #1:
{(Switch, Permit), (Hub, Deny), (Manager, Switch), (Engineer, Hub)}

Suppose a network administrator wants to expand the Job Title variable to include Distinguished Engineers, who are allowed access to the Internet, but must have an access port on a hub. The variables and domains become:

Job Title {Manager, Distinguished Engineer, Engineer}
Access Port {Switch, Hub}
Internet Access {Permit, Deny}

The following rules are added:

RULE SET ADDITIONS #1A:
5. IF Job Title=Distinguished Engineer THEN Access Port=Hub
6. IF Job Title=Distinguished Engineer THEN Internet Access=Permit Expressed as constraints, these rules become:

CONSTRAINT ADDITIONS #1A:
(Distinguished Engineer, Hub), (Distinguished Engineer, Permit)

Then, hypothetically, a Distinguished Engineer is hired by the enterprise that operates the managed network. Rule 5 says that the Distinguished Engineer has an access port on a hub. Rule 6 says that the Distinguished Engineer is allowed Internet Access. However, chaining the consequent of the Rule 5 to the antecedent of Rule 2, the system determines from Rule 2 that Internet Access is denied. Hence Rule 2 contradicts Rule 6 in the case of a Distinguished Engineer.

In a rule-based system that implemented this example, an administrator would be required to go through the rules to see which ones must be revised and why. For example, the administrator would determine that Rule 1 remains valid. The administrator would next determine that Rule 2 contradicts Rule 6, so it needs to be split into two new rules:

2a. IF Access Port=Hub AND Job Title !=Distinguished Engineer THEN Internet Access=Deny
2b. IF Access Port=Hub AND Job Title=Distinguished Engineer THEN Internet Access=Permit Rules 3 through 6, inclusive, would remain valid. However, the need to manually review and revise rules in the face of a conflict is a significant disadvantage of existing rule-based network management systems.

In a constraint-based representation, addition of a Distinguished Engineer is handled by leaving the previous constraints untouched, and merely adding an additional constraint (Hub, Permit). For the process of FIG. 2A, adding an additional or new constraint is an example of modifying the constraints in block 216. In the above example, the full set of constraints becomes:

(Switch, Permit), (Hub, Deny), (Manager, Switch), (Engineer, Hub), (Distinguished Engineer, Hub), (Distinguished Engineer, Permit), (Hub, Permit)

The new constraint (Hub, Deny) does not contradict (Hub, Permit). The network management system interprets these two constraints as associations and not as required pairings. Thus, (Hub, Permit) expresses the abstract policy that "Hubs are compatible with Permit Internet Access." Similarly, (Hub, Deny) means "Hubs are compatible with Deny Internet Access." In contrast, the rule IF Hub THEN Deny contradicts the rule IF Hub THEN Permit.

The constraint satisfaction solution for a Distinguished Engineer is:
(Job Title=Distinguished Engineer, Access Port=Hub, Internet Access=Permit)

The constraint satisfaction solution for an Engineer is:
(Job Title=Engineer, Access Port=Hub, Internet Access=Deny)
(Job Title=Engineer, Access Port=Hub, Internet Access=Permit)

The constraint satisfaction solution for a Manager is:
(Job Title=Manager, Access Port=Switch, Internet Access=Permit).

One solution states that an Engineer might get Internet Access. This solution is included because the rule sets do not state whether an Engineer should or should not get Internet Access. The solution is a deduction from original RULE SET #1.

A constraint-based system is more maintainable because we do not have to go back and change any rules. Knowledge from various sources can be integrated in a constraint-based system without any subsequent modification of the existing knowledge. Constraints are merely added to the original set.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for representing abstract network management policies and processing such policies to resolve conflicts. According to one embodiment of the invention, representing abstract network management policies and processing such policies to resolve conflicts is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for representing abstract network management policies and processing such policies to resolve conflicts as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a network according to a plurality of network management policies, comprising the computer-implemented steps of:

storing each of the policies as a first constraint;

storing at least one collective constraint in association with the first constraint;

applying a constraint satisfaction algorithm to the first constraint to determine a solution or a set of solutions;

checking whether addition of a solution or the set of solutions taken together violates any of the collective constraints;

identifying a conflict in the policies when one or more of the first constraint or collective constraints is violated; and resolving the conflict by modifying one or more of the variables, values or restrictions.

2. The method recited in claim 1, wherein storing each of the policies as a first constraint comprises the steps of storing each of the policies as a first constraint that comprises one or more variables, a set of possible values, and a set of restrictions on the values that the variables can simultaneously take.

3. The method recited in claim 2, wherein storing at least one collective constraint comprises the steps of storing one or more collective constraints in which at least one of the collective constraints is that none of the variables may interfere with one another.

4. The method recited in claim 2, wherein applying a constraint satisfaction algorithm comprises the steps of:

applying a constraint satisfaction algorithm to the stored variables, values, restrictions, to the first constraints to create zero or more solutions; and checking the collective constraints to test whether the new proposed solution does not conflict with any solutions already in the system.

5. The method recited in claim 1, wherein resolving the conflict by modifying one or more of the variables, values or restrictions further comprises the step of adding a new constraint that defines the modified variable, value or restriction.

6. The method recited in claim 1, wherein storing each of the policies as a first constraint comprises the steps of storing each of the policies as an instance constraint that comprises one or more variables, a set of possible values, and a set of restrictions on the values that the variables can simultaneously take.

7. The method recited in claim 1, wherein storing one or more collective constraints comprises the steps of storing one or more group constraints, in which at least one of the group constraints is that none of the variables may interfere with one another.

8. A method of managing a network according to a plurality of network management policies, comprising the computer-implemented steps of:

storing each of the policies as a constraint that comprises one or more variables, a set of possible values, and a set of restrictions on the values that the variables can simultaneously take;

storing one or more collective constraints, in which at least one of the collective constraints is that none of the variables may interfere with one another;

applying a constraint satisfaction algorithm to the stored variables, values, restrictions to create zero or more solutions;

checking the collective constraints for any conflicts;

identifying a conflict in the policies when zero solutions are created and when one or more of the constraints or collective constraints is violated; and resolving the conflict by modifying one or more of the variables, values or restrictions or collective constraints.

9. The method recited in claim 8, wherein resolving the conflict by modifying one or more of the variables, values or restrictions further comprises the step of adding a new constraint that defines the modified variable, value or restriction.

10. The method recited in claim 8, wherein storing each of the policies as a constraint comprises the steps of storing each of the policies as an instance constraint that comprises one or more variables, a set of possible values, and a set of restrictions on the values that the variables can simultaneously take.

11. The method recited in claim 8, wherein storing one or more collective constraints comprises the steps of storing one or more group constraints, in which at least one of the group constraints is that none of the variables may interfere with one another.

12. In a policy-based network management system that comprises at least one computer program for managing a network according to a plurality of network management policies, a method of resolving conflicts in the policies, the method comprising the computer-implemented steps of:

storing each of the policies as a constraint that comprises one or more variables, a set of possible values, and a set of restrictions on the values that the variables can simultaneously take, wherein the constraints are stored in a database associated with the system;

storing one or more collective constraints in the database, in which at least one of the collective constraints is that none of the variables may interfere with one another;

applying a constraint satisfaction algorithm to the stored variables, values, restrictions to create zero or more solutions;

checking the collective constraints for any conflicts;

identifying a conflict in the policies when zero solutions are created and when one or more of the constraints or collective constraints is violated; and resolving the conflict by modifying one or more of the variables, values or restrictions.

13. The method recited in claim 12, wherein resolving the conflict by modifying one or more of the variables, values or restrictions further comprises the step of adding a new constraint that defines the modified variable, value or restriction.

14. The method recited in claim 12, wherein storing each of the policies as a constraint comprises the steps of storing each of the policies as an instance constraint that comprises one or more variables, a set of possible values, and a set of restrictions on the values that the variables can simultaneously take.

15. The method recited in claim 12, wherein storing one or more collective constraints comprises the steps of storing one or more group constraints, in which at least one of the group constraints is that none of the variables may interfere with one another.

16. A computer-readable medium carrying one or more sequences of instructions for managing a network according to a plurality of network management policies, wherein execution of the one or more sequences of instructions by one or more processors causes the one or more processors to perform the steps of:

storing each of the policies as a first constraint;

storing at least one collective constraint in association with the first constraint;

applying a constraint satisfaction algorithm to the first constraint;

checking the solutions against the collective constraint;

identifying a conflict in the policies when one or more of the first constraints or collective constraints is violated; and resolving the conflict by modifying one or more of the variables, values or restrictions.

17. The computer-readable medium recited in claim 16, wherein storing each of the policies as a constraint comprises the steps of storing each of the policies as a constraint that comprises one or more variables, a set of possible values, and a set of restrictions on the values that the variables can simultaneously take.

18. The computer-readable medium recited in claim 17, wherein storing at least one collective constraint comprises the steps of storing one or more collective constraints in which at least one of the collective constraints is that none of the variables may interfere with one another.

19. The computer-readable medium recited in claim 17, wherein applying a constraint satisfaction algorithm comprises the steps of applying a constraint satisfaction algorithm to the stored variables, values, restrictions, and to the collective constraint to create zero or more solutions.

20. The computer-readable medium recited in claim 16, wherein resolving the conflict by modifying one or more of the variables, values or restrictions further comprises the step of adding a new constraint that defines the modified variable, value or restriction.

21. The computer-readable medium recited in claim 16, wherein storing each of the policies as a constraint comprises the steps of storing each of the policies as an instance constraint that comprises one or more variables, a set of possible values, and a set of restrictions on the values that the variables can simultaneously take.

22. The computer-readable medium recited in claim 16, wherein storing one or more collective constraints comprises the steps of storing one or more group constraints, in which at least one of the group constraints is that none of the variables may interfere with one another.

23. A policy-based networking system, comprising:
a network that comprises at least one network device under management;
a first computer program that manages the network and the network device according to a plurality of network management policies; and
a second computer program that resolves conflicts in the policies and carrying one or more sequences of instructions for managing a network according to a plurality of network management policies, wherein execution of the one or more sequences of instructions by one or more processors causes the one or more processors to perform the computer-implemented steps of:

storing each of the policies as a first constraint;

storing at least one collective constraint in association with the first constraint;

applying a constraint satisfaction algorithm to the first constraint and checking against the collective constraint;

identifying a conflict in the policies when one or more of the first constraints or collective constraints is violated; and resolving the conflict by modifying one or more of the variables, values or restrictions.

24. The system recited in claim 23, wherein storing each of the policies as a constraint comprises the steps of storing each of the policies as a constraint that comprises one or more variables, a set of possible values, and a set of restrictions on the values that the variables can simultaneously take.

25. The system recited in claim 24, wherein storing at least one collective constraint comprises the steps of storing one or more collective constraints in which at least one of the collective constraints is that none of the variables may interfere with one another.

26. The system recited in claim 24, wherein applying a constraint satisfaction algorithm comprises the steps of:
applying a constraint satisfaction algorithm to the stored variables, values,
restrictions, to create zero or more solutions; checking the solutions against the collective constraint to ensure that all the solutions
are valid.

27. The system recited in claim 23, wherein resolving the conflict by modifying one or more of the variables, values or restrictions further comprises the step of adding a new first constraint that defines the modified variable, value or restriction.

28. The system recited in claim 23, wherein storing each of the policies as a constraint comprises the steps of storing each of the policies as an instance constraint that comprises one or more variables, a set of possible values, and a set of restrictions on the values that the variables can simultaneously take.

29. The system recited in claim 23, wherein storing one or more collective constraints comprises the steps of storing one or more group constraints, in which at least one of the group constraints is that none of the variables may interfere with one another.

* * * * *